United States Patent [19]  [11] 3,718,728
Schrader  [45] Feb. 27, 1973

[54] PROCESS FOR HEAT STABILIZING CELLULOSE TRIACETATE FILMS OR SHEETS

[75] Inventor: Robert W. Schrader, Rochester, N.Y.

[73] Assignee: Eastman Kodak Company, Rochester, N.Y.

[22] Filed: April 3, 1970

[21] Appl. No.: 25,568

Related U.S. Application Data

[63] Continuation-in-part of Ser. No. 441, Jan. 2, 1970, abandoned.

[52] U.S. Cl. ............... 264/346, 264/217, 264/235, 264/237, 264/331, 264/348
[51] Int. Cl. ...................... B29c 25/00, B29d 7/02
[58] Field of Search ....264/235, 288, 342 RE, 342 R, 264/346, 348, 237, 331, 217

[56] References Cited

UNITED STATES PATENTS

| | | |
|---|---|---|
| 2,177,661 | 10/1939 | Kimble ........................... 264/235 X |
| 2,517,581 | 8/1950 | Lowry et al. ..................... 264/346 X |
| 3,068,525 | 12/1962 | Linton et al. .................... 264/346 X |
| 3,526,695 | 9/1970 | Spencer ............................ 264/346 |
| 2,069,202 | 2/1937 | Andersen et al. ................ 264/346 |
| 3,502,766 | 3/1970 | Tsuruta et al. ............ 264/342 RE X |
| 2,900,669 | 8/1959 | Booth ......................... 264/342 R X |

FOREIGN PATENTS OR APPLICATIONS

| | | |
|---|---|---|
| 778,395 | 7/1957 | Great Britain .................. 264/346 |
| 262,941 | 10/1965 | Australia ........................ 264/342 R |
| 1,410,783 | 10/1964 | France ........................... 264/342 R |

Primary Examiner—Philip E. Anderson
Attorney—Walter O. Hodsdon and John T. Lewis

[57] ABSTRACT

It has been found that highly crystallized cellulose triacetate films or sheets having significantly improved dimensional stability at temperatures as high as 240°–250π⅞ c can be manufactured by heating the films or sheets at a temperature within the range of from about 230° C to about 270° C for a very short period of time (at most about 65 seconds) while the films or sheets are maintained under a lengthwise tension of at most about 0.035 pounds per inch.

2 Claims, No Drawings

PROCESS FOR HEAT STABILIZING CELLULOSE TRIACETATE FILMS OR SHEETS

This is a continuation-in-part application of U.S. application Ser. No. 441 filed Jan. 2, 1970 by R. W. Schrader and now abandoned.

The present invention relates to the production of crystallizable cellulose acetate sheets having unexpectedly good high temperature dimensional stability.

Excellent high temperature dimensional stability is an important requisite for a certain class of cellulose acetate films; particularly those that are to be designed for use as film base for photographically sensitized materials. In some instances, it has been found that certain sensitized films, must, after exposure, be "developed" by exposing the film to a high temperature (often as high as 240°–250° C) for several seconds. Films that have poor dimensional stability under such high temperature conditions simply cannot be used successfully in many critical applications that involve the use of such high temperature development procedures. For example, ordinary cellulose acetate film base shrinks more than 15 percent and (unrestrained) excessively when it is heated (unrestrained) for 60 seconds at 240° C, while highly crystalline cellulose triacetate (prepared in a conventional manner such as by annealing a sheet of relatively amorphous cellulose triacetate at a temperature of about 220° F or more for 20 minutes) shrinks only about 1 percent upon being lowered through a well into a 240° C oven and held unrestrained for sixty seconds. This amount is nevertheless still more than is desired. Actually, in order to be considered acceptable for many very critical uses such as those described above, the percent shrinkage must be at most 0.5 percent, and preferably should be at most only about 0.2 percent.

It has now been discovered that cellulose acetate films having excellent high temperature dimensional stability can be obtained by heat treating (a) at least mostly amorphous but crystallizable cellulose triacetate film or sheet (preferably one containing at most about 2 weight percent of hydroxyl and at least about 41 weight percent of acetyl, and having an intrinsic viscosity of at least about 1.0), (b) by quickly increasing the temperature of the film or sheet to a temperature within the range of from about 230° C to about 270° C, (c) holding the film or sheet within this temperature range for from about 15 to about 65 seconds, and (d) while the film is being thereby quickly heat treated, maintaining it under a lengthwise restraint or tension of at most about 0.035 pounds per inch. After the very short heat treatment the temperature of the film must quickly be reduced to below about 210° C.

Still another important limitation that must be observed in the practice of the present invention in order to obtain a film having an acceptable low "shrinkage value" (when tested for 60 seconds in a 240° C oven) is that the cellulose acetate film must have at most only about 5 weight percent of plasticizer [as compared to practically all conventional cellulose acetate photographic film base or packaging sheeting material which contains more than 10 weight percent of plasticizer(s)]. Thus, the films of the present invention consist essentially of highly crystalline cellulose triacetate (containing at most about 2 weight percent of hydroxyl and having intrinsic viscosities of at least about 1.0) and from 0 to about 5 weight percent of plasticizer, and having a "shrinkage value" (when tested for 60 seconds in a 240° C oven) of at most about 0.5 percent. Such films should also have thicknesses of at most about 10 mils.

Actually, the amount of time (60 seconds) at 240° C in this test is more than that to which the sensitized, final film products are ordinarily subjected. However, it has been found that materials which are considered "acceptable" by this test will certainly be sufficiently shrinkage-resistant and distortion-resistant under ordinary end-use conditions to be considered completely "acceptable" for such end uses, in so far as the film base's "high temperature" resistance to shrinkage and distortion are concerned.

The highly crystalline, high temperature resistant, dimensionally stable cellulose triacetate films of this invention can readily be prepared by any one of several convenient manipulative procedures, which will be evident to the ordinarily skilled artisan in view of the requirement of abiding strictly by all of the process elements set out above. Thus, pieces or strips of the relatively amorphous starting material can be conducted continuously through an oven in which the temperature is held at the critical region (from about 230° C to about 270° C). Thin films such as those of this invention attain the temperature of their environment quickly. Hence, the amount of time the films or sheets are exposed to this high temperature environment should be the amount of time set out above. During this "oven" exposure, the lengthwise restraint must be at most about 0.035 pounds per inch, while the widthwise restraint should be essentially only that resulting from the equipment, [such as that due to friction on idler rolls (when long lengths of film or sheeting are processed), or none, when individual pieces of film are processed]. The film can also be cooled, quickly or slowly, thereafter, without apparently adversely effecting the excellent dimensional stability that has been "built into" the film. Freedom from perimeter restraint on the edges of the film is required during the high temperature treatment step because this decreases stresses in the final heat-treated, stabilized product. In view of this lack of widthwise perimeter restraint, it is a surprising result of the present process that the films treated in this way exhibit an unexpectedly low amount of widthwise shrinkage during the heat-treating process. For example, the cellulose triacetate film that is treated in accordance with the following Examples shrank only 4 percent (widthwise) during the process, but still exhibited a 240° C "shrinkage value" of only 0.2 percent, while an identical film sample that is simply annealed at 220° C for 15 minutes shrank a total of 12 percent during the annealing step, and had a 240° C "shrinkage value" that is about triple that of the film that was gradually heated through the critical temperature range.

EXAMPLES

Films of unplasticized cellulose triacetate (containing 43.3 percent acetyl, 1 percent hydroxyl and having an intrinsic viscosity of about 2.2) that have been conventionally solvent cast and air dried and which are substantially non-crystalline and approximately 5 mils thick are heat treated in a conventional forced-draft oven by first clamping the films under a prescribed amount of lengthwise tension and then placing the films for a very brief period of time in the oven. Various oven temperatures, heat-treating time periods, and "tensions" are utilized. The films are then suddenly quenched, when they are removed from the oven, by quickly exposing them to a stream of ambient (27° C) air. Then the heat-treated films are subjected to the 60 second/240° C "hot oven" test described above. Percent shrinkage is also recorded. Results of tests such as these are set out in Table I.

TABLE 1

| Experiment No. | Oven Temp. (°C) | time in Oven (sec.) | Tension (lb/in.) | 240°C Shrinkage(%) | M.I.T. Folds |
|---|---|---|---|---|---|
| 1 | 208 | 63 | 0.062 | 4.6 | |
| 2 | 208 | 63 | 0.117 | 4.4 | |
| 3 | 210 | 22 | 0.014 | 15.9 | 35 |
| 4 | 210 | 62 | 0.014 | 4.5 | 37 |
| 5 | 210 | 22 | 0.117 | 22.2 | 18 |
| 6 | 210 | 62 | 0.117 | 10.0 | 20 |
| 7 | 220 | 22 | 0.014 | 9.5 | 35 |
| 8 | 220 | 62 | 0.014 | 3.2 | 28 |
| 9 | 220 | 22 | 0.117 | 8.8 | 10 |
| 10 | 220 | 62 | 0.117 | 2.4 | 13 |
| 11 | 230 | 63 | 0.014 | 0.5 | |
| 12 | 230 | 63 | 0.062 | 1.2 | |
| 13 | 230 | 63 | 0.117 | 1.7* | |
| 14 | 230 | 23 | 0.014 | 0.3 | |
| 15 | 230 | 22 | 0.014 | 0.4 | 28 |
| 16 | 230 | 62 | 0.014 | 0.3 | 20 |
| 17 | 230 | 22 | 0.117 | 1.6* | 17 |
| 18 | 230 | 62 | 0.117 | 1.2* | 19 |
| 19 | 230 | 23 | 0.117 | 1.8* | |
| 20 | 240 | 62 | 0.014 | 0.3 | 14 |
| 21 | 250 | 62 | 0.014 | 0.2 | 9 |
| 22 | 260 | 62 | 0.014 | 0.2 | 8 |
| 23 | 270 | 62 | 0.014 | 0.1 | 3 |

* Distortion during heat treatment.

The "plasticizers" mentioned above that can be present, if desired, in the cellulose triacetate films that are processed in accordance with the present invention are all of those that can ordinarily be used in cellulose acetate photographic film base and wrapping sheeting materials. This includes such well known materials as triphenylphosphate and the like. Other materials can also be present in the film products of this invention in minor amounts, so long as the basic crystallizability of the cellulose triacetate materials is not excessively impaired. This includes dyes, pigments, chemical stabilizers and the like.

This invention has been described in detail with particular reference to preferred embodiments thereof, but it will be understood that variations and modifications can be effected within the spirit and scope of the invention.

What is claimed is:

1. A process for increasing the dimensional stability of at least mostly amorphous, crystallizable cellulose acetate film, which process comprises heating said cellulose acetate film at a temperature within the range of from about 230° C to about 270° C for a period of time equal to from about 15 to about 65 seconds and then quickly reducing the temperature of said film to below about 210° C; said film being maintained under no widthwise tension and a lengthwise tension of at most about 0.035 pounds per inch during said period of time.

2. A process as in claim 1, wherein said crystallizable cellulose acetate sheets consist essentially of cellulose triacetate, having at most about 2 weight percent of hydroxyl and at least about 41 weight percent of acetyl, and an intrinsic viscosity of at least about 1.0; said sheets also containing from 0 to about 5 weight percent of plasticizer.

* * * * *

PO-1050
(5/69)

UNITED STATES PATENT OFFICE
CERTIFICATE OF CORRECTION

Patent No. 3,718,728            Dated     February 27, 1973

Inventor(s) Robert W. Schrader

It is certified that error appears in the above-identified patent and that said Letters Patent are hereby corrected as shown below:

Abstract, line 4, "250π⅔c" should be "250°C";
Column 1, line 22 to line 23, first occurrence,
    "(unrestrained)" should be "distorts";

Signed and sealed this 25th day of June 1974.

(SEAL)
Attest:

EDWARD M. FLETCHER, JR.            C. MARSHALL DANN
Attesting Officer                  Commissioner of Patents